March 22, 1955  A. A. ABRAMOSKA ET AL  2,704,671

FLUID OPERATED CHUCK

Filed Sept. 28, 1951  2 Sheets-Sheet 1

INVENTOR.
ALFRED A. ABRAMOSKA &
JOHN R. COX
BY

March 22, 1955 A. A. ABRAMOSKA ET AL 2,704,671
FLUID OPERATED CHUCK
Filed Sept. 28, 1951 2 Sheets-Sheet 2
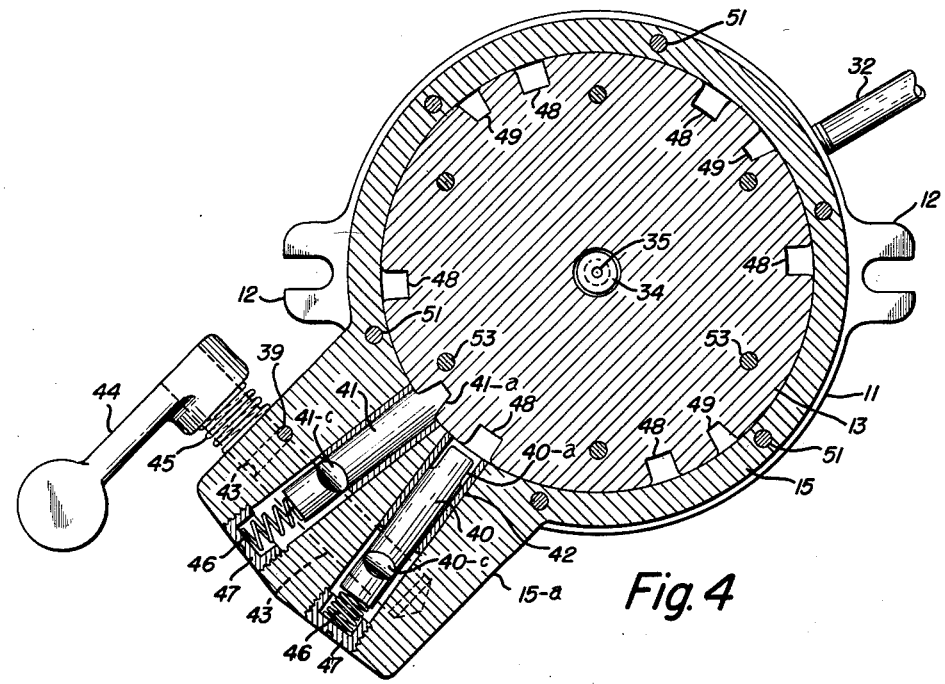
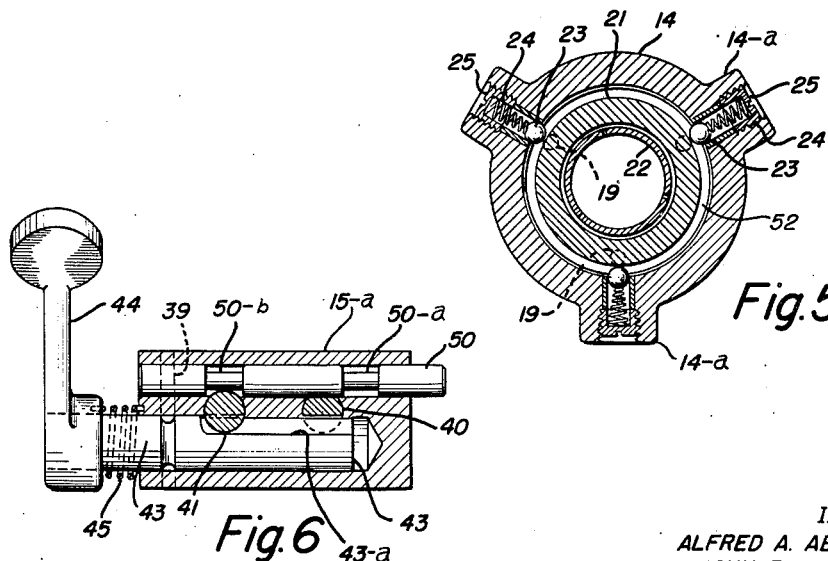
INVENTOR.
ALFRED A. ABRAMOSKA &
BY JOHN R. COX

United States Patent Office 2,704,671
Patented Mar. 22, 1955

2,704,671

FLUID OPERATED CHUCK

Alfred A. Abramoska and John R. Cox, Cleveland, Ohio

Application September 28, 1951, Serial No. 248,712

8 Claims. (Cl. 279—4)

Our invention relates to fluid operated chucks for holding tools, workpieces and the like.

A division of this application has been filed as co-pending patent application Serial No. 428,970, filed May 11, 1954.

An object of our invention is to provide an improved construction in a chuck for efficient and facile operation of the chuck with the use of fluid, such as compressed air.

Another object is the provision of a chuck operable by fluid, such as compressed air, and which is readily operable in a plurality of rotational positions.

Another object is the provision of a chuck having a rotatable head in which the actuating mechanism operated by fluid, such as compressed air, is mounted within the rotatable head.

Still another object is the provision of a chuck having a base member and a body member rotatable to selected positions relative to the base member and in which fluid, such as compressed air, introduced to the body member actuates a collet positioned in the body member.

Another object is the provision of an arrangement whereby fluid, such as compressed air, may be utilized for actuating a collet in a chuck and in which the force of the fluid does not bind the rotatable portion of the chuck to the fixed portion of the chuck so that the rotatable portion may be readily rotated notwithstanding the introduction of the fluid for actuation of the collet.

Another object is the provision of a construction embodying a flexible diaphragm within a rotatable body of a chuck, the diaphragm upon being flexed by fluid, such as compressed air, actuating a contractable collet.

Another object is the provision of a chuck having a construction of a fluid actuated collet in a rotatable head and indexing means for holding the rotatable head in a preselected rotative position.

Another object is the provision of a collet having a fluid-actuated diaphragm to operate a collet in a rotatable head and having an indexing member for selectively engaging the rotatable head and holding it in desired position.

Another object is the provision of a chuck having an improved indexing device and having a plurality of cooperative indexing means for holding the chuck in a selected one of a plurality of arrangements.

Another object is the provision of an indexing device for a rotatable chuck having a plurality of indexing plungers and a plurality of sets of recesses in the rotatable head, each set cooperating with a different plunger.

Another object is the provision of a construction of a rotatable chuck and indexing mechanism provided for maximum flexibility and selection of rotative positions of the chuck. Another object is the provision of an improved chuck having an arrangement and combination of features to provide results and to operate in a manner not heretofore known.

Other objects and a fuller understanding of our invention may be had by referring to the following description and claims, taken in conjunction with the accompanying drawing, in which:

Figure 4 is a horizontal cross-sectional view of our device taken through the line 4—4 of Figure 2;

Figure 5 is a horizontal sectional view of our device taken through the line 5—5 of Figure 2; and Figure 6 is a partial sectional view of our device taken through the line 6—6 of Figure 1.

Figure 1:
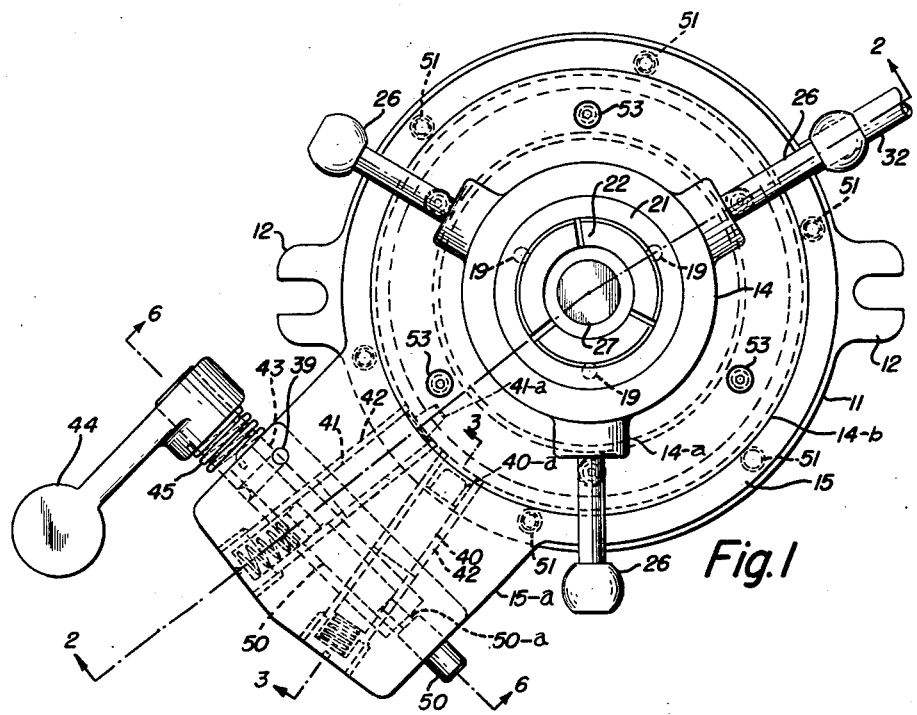
Figure 1 is a plan view of our device.

In the several views of the drawing, the base member or mounting plate is represented by the reference character 11. The base member 11 is provided with ears 12, which are for mounting the base member 11 to the machine or apparatus to which our chuck is mounted in use. A generally cylindrical-shaped body member 14 is axially aligned with the base member 11 and mounted thereto by a ring cap 15. The ring cap 15 is arranged to hold the body member 14 to the base member 11 and at the same time to permit rotation of the body member 14 relative to the base member 11. The body member 14 has a bottom plate 13 secured thereto become a part of, and to move with, the body member 14.

A plurality of screw bolts 51 extending upwardly from the base member 11 hold the ring cap 15 in position on the base member 11. The ring cap 15 overlaps the outer edge of the bottom plate 13 to hold the assembled body member 14 and bottom plate 13 to the base member 11, while permitting rotation of the assembled body member 14 with the bottom plate 13 relative to the base member 11.

The cylindrical body member 14 has three enlargements or bosses 14-a extending longitudinally thereof at three spaced intervals. Also the body member 14 has a flange portion 14-b extending around its peripheral edge. At its lower portion, the flange 14-b overlaps to a small degree the upper flange of the ring cap 15.

The body member 14 has a central bore extending down from its upper end and within this bore there is positioned a contractable resilient collet 22. The collet is split, as shown, to have a plurality of jaws resiliently movable relative to each other and adapted to grip a tool or workpiece held between the jaws when contracted inwardly. An actuating sleeve 21 positioned within the bore of body member 14 surrounds the collet 22. The cammed surfaces of collet 22 and actuating sleeve 21 are such that upon their engagement and the movement of the actuating sleeve 21, the collet is contracted and released in accordance with the direction of movement of the actuating sleeve 21. Upon upward movement of the actuating sleeve 21, the collet jaws are flexed to contract the collet 22 and to grip the tool or workpiece positioned in the collet. Upon downward movement of the actuating sleeve 21, the collet is released by the actuating sleeve and the jaws resume their straight and uncontracted position.

Directly below the bore containing the collet and actuating sleeve there is an open space 16 separated by a wall from the described bore. Within the open space 16 there is mounted a flexible and resilient diaphragm 17 made of rubber, rubber-like material or other suitable resilient material appropriate for the flexing of the diaphragm 17. The diaphragm is clamped by the body member 14 and the bottom plate 13 around its peripheral edges by a plurality of screw bolts 53. The screw bolts 53 extend downwardly of the flange 14-b of the body member through the rubber diaphragm and into the bottom plate 13.

A steel plate 18 rests upon the top of the diaphragm 17 and almost covers the exposed portion of the diaphragm, extending across the area of the open space 16. The steel plate 18 is relatively rigid and is arranged to move up and down as the flexible diaphragm 17, upon being flexed, moves up and down in the open space 16. There is sufficient space above the steel plate 18 to permit the required amount of movement of the steel plate as the diaphragm 17 may flex upwardly.

The open space 16 includes a chamber in its lower portion below the rubber diaphragm 17. Upon the introduction of compressed air into the chamber, of which the diaphragm 17 forms a wall, the compressed air tends to flex or force the diaphragm upwardly and thus to raise the steel plate 18 carried upon the rubber diaphragm. Thus there is an air chamber within the rotatable body member or head of the chuck, the chamber having a flexible wall which changes position in accordance with the introduction of fluid into the chamber, the fluid being introduced differing in pressure from atmospheric pressure and usually being in compressed form to be of a pressure higher than atmospheric pressure.

Three handles 26 are mounted in the bosses or enlargements 14–a in a manner such that the three handles 26 extend horizontally outward from the body member. These handles facilitate manual turning of the rotatable head of the chuck as desired. A vent 20 extends from the upper portion of the open space 16 above the diaphragm. The vent 20 communicates with a hollow opening in one of the handles 26 and thus provides a vent or communication between the top portion of the open space above the diaphragm with atmosphere. Upon the raising of the diaphragm by compressed air below the diaphragm, the air above the diaphragm may readily escape into atmosphere without being compressed itself.

Three reciprocating pins 19 are mounted in suitable openings in the body member 14 below the actuating sleeve 21. The bottom ends of the pins 19 rest upon the steel plate 18 and the upper ends of the pins 19 engage the bottom of the actuating sleeve 21. As the pins 19 are free to reciprocate in the body member 14, the raising of the steel plate 18 by the diaphragm 17 pushes the pins 19 upwardly, which in turn push the actuating sleeve 21 upwardly to contract the collet 22. Therefore, fluid under pressure other than atmospheric pressure, such as compressed air, introduced under the rubber diaphragm within the enclosed chamber in the body member, causes the collet to contract and to grip the tool or workpiece positioned therein.

Figure 2:
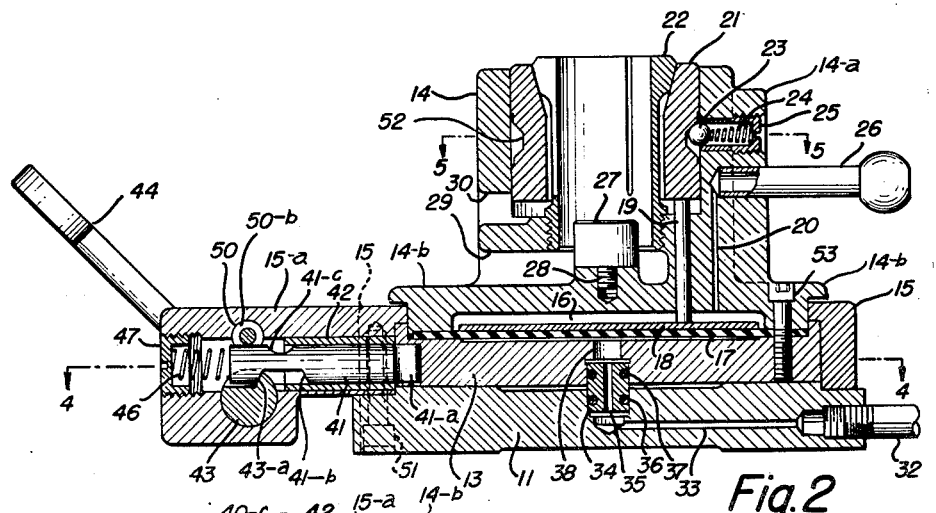
Figure 2 is a cross-sectional view of our device taken through the line 2—2 of Figure 1.

Radially disposed in the body member 14 at the location of the bosses or enlargements 14–a are three bores for accommodating detent balls 23. Each of the three detent balls 23 is resiliently held inwardly by a spring 24, which in turn is retained in position by a retainer plug 25 threadably engaged in a boss or enlargement 14–a. A recess of groove 52 is formed in the outer portion of the actuating sleeve 21 and this groove 52 has inclined walls, as shown in Figure 2. The arrangement of the detent balls 23 and the inclined walls of the groove or recess 52 is such that the balls 23 resiliently urge the actuating sleeve 21 downwardly upon the lowering of the diaphragm 17 when compressed air is released from the air chamber. The arrangement of the detent balls 23 and the walls of the recess 52 also is such that the actuating sleeve is resiliently retained in the body, even though the collet 22 may be temporarily removed. The cooperation of the co-acting cammed surfaces of the collet and actuating sleeve and the action of the detent balls upon the walls of the groove 52 are such that when the force of the compressed fluid is removed from the chamber and the diaphragm is lowered, the actuating sleeve 21 is moved downwardly and the collet is released to its normal uncontracted position. Upward movement of the actuating sleeve by the compressed fluid moving the diaphragm upwardly tends to overcome the springs 24 to permit the actuating sleeve 21 to contract the collet 22.

Axially within the body member 14 at the lower portion of the bore there is a tapped hole 28 and a workstop 27 threadably secured to the base member by means of a threaded stem in the tapped hole 28. The workstop 27 of a selected height adjusts the amount that a tool or workpiece may move down in the bore within the collet. Suitably arranged chip clearance holes 29 and 30 are disposed in the body member 14, as shown in the drawings, particularly in Figure 2. These permit chips to escape out from below the collet and below the actuating sleeve.

In practice, we prefer to utilize compressed air for actuating our device. However, other fluid under a pressure different from atmospheric pressure could be utilized. For the purpose of this description, we will generally refer to compressed air as the fluid being utilized. A pipe 32 threadably engaged to the base member 11 is adapted to communicate with a source of compressed air, such as a tank or compressor. Formed within the base member 11 there is a conduit or hole 33 extending radially from the center of the base member to communicate with the pipe 32. Axially positioned within the base member 11 there is an open space at the end of the conduit 33. Formed within the bottom plate 13 of the rotatable head there is another enlarged space which registers with the central enlarged space of the base member 11. Positioned within the mating enlarged spaces in members 11 and 13 there is a bronze bushing 34. This bushing 34 is partially within the central open space in the member 11 and partially within the open space within the member 13, and thus extends between the two. There is a slight clearance between members 11 and 13 in the local vicinity of the bushing 34. The arrangement of the bushing 34 and the registering central open spaces in members 11 and 13 is such that the bushing 34 forms a male member extending from one member into the open space of the other member.

To provide a hermetic seal between the bushing 34 and the base member 11, an O ring 36 of rubber or other suitable sealing material is positioned in a groove in the bushing 34 and in sealing engagement with the base member 11. Another O ring 37 or other seal is provided between the upper portion of the bushing 34 and the plate 13 to provide a hermetic seal between the bushing and rotatable head. An opening 35 extends axially through the bushing 34 and is in communication with the conduit 33 in the base member. An open space 38 above the bushing 34 provides communication through the member 13 to the chamber within the body member below the diaphragm 17. Thus, compressed air flowing through the pipe 32 flows through the conduit 33 up through the hole 35 in the bushing 34, through the vertical hole 38 and into the chamber in the lower portion of the open space 16 below the diaphragm 17. This compressed air flowing into the chuck from the pipe 32 forces the rubber diaphragm upward to actuate the actuating sleeve and to contract the collet.

As the bushing 34 is sealed to both the non-rotating member 11 and the rotating member 13, there is a slippage between the bushing and its O ring seals relative to one or more of members 11 and 13. The bushing 34 may be so tightly engaged through the O ring 37 to the member 13 that the bushing 34 will rotate as the head of the chuck rotates and thus there will be slippage between the lower end of the bushing 34 and the lower O ring 36 relative to the base member 11. Conversely, the bushing 34 may more tightly engage the base member 11 and thus there will be slippage between the bushing and the upper O ring 37 relative to the member 13. Also, the relatively tight engagement may be substantially the same at both the upper and lower portions of the bushing 34 and thus there may be some relative movement or slippage between the bushing 34 and both the members 11 and 13. In any event, the bushing 34 provides a pin or axle upon which the rotating part pivots or turns or is turned. The bushing 34 may be referred to as a pivot pin or axle for the rotating head of the chuck whether it turns with, or is stationary relative to, the rotating part.

By the arrangement described, it is to be noted that upon introduction of compressed air to actuate the chuck, there is no binding between the rotating part and the stationary part of the chuck because the air chamber and diaphragm are both within the rotating head. The bushing provides both a pivot pin and a means of introducing compressed air into the air chamber. The moving parts for contracting the collet are all within the rotating head. The base member introduces the compressed air through the central opening in the bushing to the chamber within the rotating head or body of the chuck.

Extending out from one side of, and integral with, the ring cap 15 is the extension or arm portion 15–a. The extension 15–a provides the housing and support for the indexing arrangement utilized in our device. Two openings extend through the arm portion 15–a of the ring cap 15 and are disposed in a radial direction toward the axial center of the rotatable head. Mounted in one of the radially directed openings in the arm 15–a is an indexing plunger 40 adapted to reciprocate in a sleeve bushing 42 within the radial opening. The plunger 40 has a free sliding fit in the bushing 42 and is adapted to move radially inward and outward relative to the bottom plate 13 of the rotatable body. The inner end, that is the end directed toward the bottom plate 13, is rounded to form the round end 40–a. Formed in the outer peripheral wall of the bottom plate 13 of the rotatable head are six round openings 48 adapted to complementarily fit and receive the round end 40–a of the plunger 40. When the plunger 40 is in its inward position, the round end 40–a fits within one of the six round openings 48 and thus locks the rotatable head against rotation. A coil spring 46 at the outer end of the plunger 40 is arranged to resiliently urge the plunger 40 radially inward toward the bottom plate 13 and thus into one of the round openings 48. A retaining plug 47 threadably screwed into the arm portion 15–a retains the spring 46 in position to resiliently press against the plunger 40 and also provides for adjustment of the spring tension to be applied.

Formed in the plunger 40 in its upper wall and near its rear or outer end is a notch 40–c, this upper notch 40–c extending crosswise of the axis of the plunger. Formed in the lower portion of the plunger 40 below the upper notch 40–c is a lower notch or cutaway portion 40–b. As shown in the drawings, the upper notch 40–c has a semi-cylindrical wall, whereas the lower notch 40–b extends lengthwise of the plunger 40 a greater distance, as particularly seen in Figure 3.

Also extending in a radial direction relative to the rotatable head and disposed within the arm or extension 15–a is another plunger 41. Plunger 41 also slidably rides in a sleeve bushing 42 within the opening extending through the arm 15–a. The plunger 41 is similarly resiliently urged radially inward toward the rotatable head of the chuck by a coil spring 46 retained by the retaining plug 47. As in the case of the other plunger, turning the plug 47 will adjust the tension of the spring 46.

The plunger 41 has an end 41–a which in cross-section has a rectangular shape and which in plan view has a wedge shape, as seen particularly in Figure 4. Formed in the outer peripheral wall of the bottom plate 13 of the rotatable head there are four sockets or openings 49, these sockets or openings having a rectangular cross-section with sloping walls to complement the shape of the wedge-shaped end 41–a of the plunger 41. The rectangular or wedge-shaped end 41–a is adapted to enter and be complementarily received in each of the rectangular-shaped openings 49. The difference in the shapes of the round end 40–a and the rectangular end 41–a relative to the sockets 48 and 49 is such that the rectangular wedge-shaped end 41–a will fit only in the rectangular-shaped sockets 49. Thus, the plunger 40 cooperates only with the six sockets 48 and the plunger 41 cooperates only with the four sockets 49.

The plunger 41 has an upper notch 41–c extending across its upper portion near its rear or outer end. The plunger 41 also has a lower notch 4–b extending across its lower portion near its outer end and below the upper notch 41–c. The upper notch 41–c of the plunger 41 corresponds in size and position with the upper notch 40–c of the plunger 40. Likewise, the lower notch 41–b of the plunger 41 corresponds in size and position with the lower notch 40–b of the plunger 40.

Figure 3:
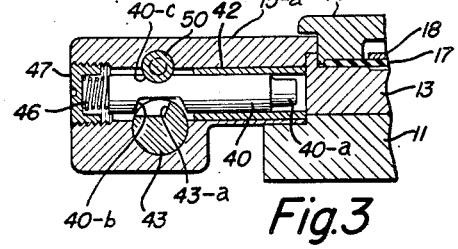
Figure 3 is a partial cross-sectional view of our device taken through the line 3—3 of Figure 1.

Disposed in a bore extending transversely of the arm or extension portion 15–a is an actuating member 43. The actuating member 43 is adapted to slidably rotate within the bore in the arm 15–a receiving the member. Extending longitudinally of the cylindrical-shaped actuating member 43 there is a cutaway portion or cross-slot 43–a. The cutaway portion 43–a, shown in Figures 2, 3 and 6, has a flat wall and a short wall, the short wall being disposed substantially radial of the actuating member 43. The short wall of the cutaway portion 43–a is adapted to complementarily engage the rear wall of the lower notch 40–b of the plunger 40 and the lower notch 41–b of plunger 41. A handle 44 extending from the outward end of the actuating member 43 is adapted to rotate the actuating member 43. Downward movement of the handle 44 rotates the actuating member 43 in a counter-clockwise direction, as seen in Figures 2 and 3. A spring 45 suitably anchored between the handle 44 and the arm portion 15–a and coiled around the outwardly extending portion of the actuating member 43 is biased to maintain the handle 44 in the upward position of Figure 2 and to rotate the actuating member 43 in a clockwise direction, as seen in Figures 2 and 3. A cross-pin 39 disposed transversely of the extension or arm 15–a engages in a groove provided in the actuating member 43 for the purpose of retaining the actuating member 43 in position and at the same time to permit rotation of the actuating member 43. For removal of the actuating member 43, the cross-pin 39 is removed and the actuating member is longitudinally pulled out of the arm or extension 15–a.

A selection pin or bolt 50 is disposed transversely of the arm or extension 15–a and above the actuating member 43. The pin 50 has a sliding fit with the bore provided for it in the arm 15–a so that the pin 50 may readily be slid longitudinally of its length and its position relative to the arm 15–a modified. The pin 50 is somewhat longer than the width of the arm or extension 16–a so that one end or the other of the pin 50 protrudes. By manually pressing on the protruding end to press it inwardly of the arm 15–a, the longitudinal position of the pin is changed. There are two annular grooves provided in the pin 50, the annular groove 50–a being near one end of the pin and the annular groove 50–b being near the other end. The relative positions of the annular grooves 50–a and 50–b is illustrated in Figure 6. When the pin 50 is moved to one of its positions, such as in Figure 6, then the annular groove 50–b clears the plunger 41 and permits the plunger 41 to reciprocate without interference of the pin 50. When in this same position of Figure 6, the intermediate portion of pin 50, having its maximum diameter, is positioned within the upper notch 40–c of the plunger 40 and thus retains the plunger 40 in its rearward or withdrawn position, as shown in Figure 3. In Figure 3, the plunger 40 is withdrawn away from the lower plate 13 and thus out of a round socket 48. The plunger 40 is held in this retracted position against the resilient pressure of the spring 46 by the interlocking of the pin 50 and the plunger 40, through the interengagement of the pin 50 in the upper notch 40–c. The plunger 40 is initially pulled back to its retracted or withdrawn position by the actuating member 43 upon downward movement of the handle 44. When in this retracted position, the pin 50 is longitudinally slid to the position shown in Figures 3 and 6 so that the pin 50 retains the plunger 40 in its retracted position after the handle 44 is released.

To restrain the plunger 41 in its rearward or retracted position, the handle 44 is pressed downwardly to rotate the actuating member 43. This causes the short flat side of the cutaway portion 43–a of the actuating member 43 to engage a side of the lower notch 41–b of the plunger 41 and to draw the plunger 41 rearwardly. When in this rearward position, the protruding end of the pin 50 is manually pressed to change the positions of the annular grooves 50–a and 50–b and thus to clear the upper notch 40–c of the plunger 40 and to cause the pin 50 to interlock with the upper notch 41–c of the plunger 41. In this position, the plunger 41 is held in retracted positive by the pin 50 while the plunger 40 is free to reciprocate. The pin 50 therefore acts as a selective means to determine which of the plungers is to be free to enter the sockets in the rotatable head of the chuck, one plunger or the other being held in retracted position by the selection pin 50. The free plunger is resiliently moved inwardly to engage in a complementary socket of the rotatable head and is retracted by operation of the actuating member. The free plunger is adapted to enter only one of the two sets of sockets, plunger 40 cooperating with the sockets 48 and the plunger 41 cooperating with the sockets 49. In the arrangement shown, there are six equidistantly spaced sockets 48 and for equidistantly spaced sockets 49 in the circle of the outer peripheral wall of the rotatable head, and particularly the bottom plate 13 thereof.

Other arrangements of holes or sockets may be formed in the bottom plate 13 so that any desired indexing arrangement may be had. Likewise, more than two plungers may be utilized, if desired, to obtain greater subdivision of the circle and selectivity in choice of positions in which the rotatable head is to be locked. Thus, the rotatable head of the chuck may be rotated and held in a number of selected positions by releasing the plunger then being used and by rotating the head to the next socket corresponding to the plunger being utilized. The construction provides a flexible arrangement adapted to meet a wide variety of conditions and operating requirements.

Our construction provides a chuck which is quickly and easily operated by fluid pressure and at the same time which is readily rotated without binding by the force of the fluid pressure. It also combines an indexing arrangement which is particularly appropriate and convenient for the use of the rotating chuck. The advantages and improved results obtainable with our improved chuck will be readily ascertainable by those using such devices and appreciating the shortcomings and disadvantages of the prior devices.

The present disclosure includes the description contained in the appended claims, as well as the above description and drawings.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A chucking device comprising the combination of a base member, a body member adapted to rotate relative to said base member, said body member having an open space, a contractible collet positioned in said open space, an actuating sleeve positioned in said open space for operating said collet, said body member having a chamber, a resilient diaphragm positioned in said chamber, a rigid member carried by said diaphragm and movable therewith, a pin member engageable by said rigid member and adapted to engage and move said actuating sleeve, said base member carrying a conduit adapted to communicate with a source of compressed fluid, and a cylindrical member positioned axially of, and extending between said base member and body member, said cylindrical member having a central opening thereof providing communication between said conduit and said chamber on a side of said diaphragm, said cylindrical member being sealed to said base member and to said body member and arranged to permit relative rotative movement between said cylindrical member and one of said base member and body member for permitting rotation of the body member relative to the base member and flow of compressed fluid therebetween.

2. A chucking device comprising in combination a base member, a rotatable member, connecting means for connecting the rotatable member to the base member and permitting rotative movement of the rotatable member relative to the base member, a contractible collet carried by the rotatable member, a flexible diaphragm carried by the rotatable member, said diaphragm and said rotatable member forming an enclosed space, operating means operatively connecting said diaphragm and said collet for contracting said collet upon flexing of said diaphragm, conduit means carried by said base member and adapted to communicate with a source of fluid under pressure different from atmospheric pressure, an axle member extending between said base member and rotatable member, said axle member and at least one of said base member and rotatable member being rotatably movable relative to the other to provide for the movement of the rotatable member relative to the base member, said axle member having an opening therethrough to provide communication between said conduit means and said enclosed space, and sealing means providing a seal for said fluid between said axle member and said at least one of the base member and rotatable member, the said collet being contractible by said diaphragm through said operating means upon introduction of said fluid to said open space through said conduit means and said opening in said axle member.

3. In combination, a base member, a body member, said body member having a bore axially disposed therein, a clamping member carried by the said base member and slidably engaging the said body member to hold said base member and body member together and to permit rotation of said body member relative to said base member, a contractible collet disposed in said bore, an actuating sleeve disposed in said bore to contract the said collet upon moving in one direction and to release the said collet upon moving in another direction, a flexible diaphragm carried by said body member axially aligned with said actuating sleeve and said collet, said body member having a chamber formed therein, said diaphragm forming a wall of said chamber, connecting means operatively connecting said diaphragm and said actuating sleeve to provide for movement of the actuating member by said diaphragm, a pin member axially aligned with said collet and actuating sleeve and interconnecting said base and body member and to provide a pivot for rotation of said body member relative to said base member, conduit means carried by said base member adapted to communicate with a source of fluid under pressure different from atmospheric pressure, said pin member having an opening therethrough communicating with said chamber and said conduit means to permit said fluid to enter said chamber in any rotative position of said body member relative to the said base member.

4. In a chucking device, the combination of a rotatable head adapted to carry a contractible collet, a flexible diaphragm carried by the rotatable head, said rotatable head having an open space on a side of said diaphragm for admitting fluid to said head and for permitting the flexing of said diaphragm, means operatively connecting said diaphragm and said collet to cause contraction of said collet in accordance with movement of said diaphragm, a base member carrying said head to permit rotation of said head, a pin extending between said head and said base member at the axis of the rotation of said head, said base member carrying a conduit adapted to communicate with a source of fluid under a pressure different than atmospheric pressure, said pin having an opening therein providing communication between said conduit and said open space, and sealing means for providing a seal between said pin and one of said base member and said head.

5. A chucking device comprising the combination of a base member, a body member adapted to rotate relative to said base member, said body member having an open space, a contractible collet positioned in said open space, an actuating sleeve positioned in said open space for operating said collet, said body member having a chamber, a resilient diaphragm positioned in said chamber, a rigid member carried by said diaphragm and movable therewith, a pin member engageable by said rigid member and adapted to engage and move said actuating sleeve, said base member carrying a conduit adapted to communicate with a source of compressed fluid, and a cylindrical member positioned axially of, and extending between said base member and body member, said cylindrical member having a central opening thereof providing communication between said conduit and said chamber on a side of said diaphragm, said cylindrical member being sealed to said base member and to said body member and arranged to permit relative rotative movement between said cylindrical member and one of said base member and body member for permitting rotation of the body member relative to the base member and flow of compressed fluid therebetween.

6. A chucking device comprising in combination a base member, a rotatable member, connecting means for connecting the rotatable member to the base member and permitting rotative movement of the rotatable member relative to the base member, a contractible collet carried by the rotatable member, a flexible diaphragm carried by the rotatable member, said diaphragm and said rotatable member forming an enclosed space, operating means operatively connecting said diaphragm and said collet for contracting said collet upon flexing of said diaphragm, conduit means carried by said base member and adapted to communicate with a source of fluid under pressure different from atmospheric pressure, an axle member extending between said base member and rotatable member, said axle member and at least one of said base member and rotatable member being rotatively movable relative to the other to provide for the movement of the rotatable member relative to the base member, said axle member having an opening therethrough to provide communication between said conduit means and said enclosed space, and sealing means providing a seal for said fluid between said axle member and said at least one of the base member and rotatable member, the said collet being contractible by said diaphragm through said operating means upon introduction of said fluid to said open space through said conduit means and said opening in said axle member.

7. In combination, a base member, a body member, said body member having a bore axially disposed therein, a clamping member carried by the said base member and slidably engaging the said body member to hold said base member and body member together and to permit rotation of said body member relative to said base member, a contractible collet disposed in said bore, an actuating sleeve disposed in said bore to contract the said collet upon moving in one direction and to release the said collet upon moving in another direction, a movable wall member carried by said body member axially aligned with said actuating sleeve and said collet, said body member having a chamber formed therein, said movable wall member forming a wall of said chamber, connecting means operatively connecting said movable wall member and said actuating sleeve to provide for movement of the actuating member by said movable wall member, a pin member axially aligned with said collet and actuating sleeve and interconnecting said base member and body member to provide a pivot for rotation of said body member relative to said base member, and conduit means carried by said base member adapted to communicate with a source of fluid under pressure different from atmospheric pressure, said pin member having an opening therethrough communicating with said chamber and said conduit means to permit said fluid to enter said chamber in any rotative position of said body member relative to the said base member.

8. In a chucking device, the combination of a rotatable head adapted to carry a contractible collet, a movable wall member carried by the rotatable head, said rotatable head having an open space on a side of said movable wall member for admitting fluid to said head and for permitting the movement of said movable wall member, means operatively connecting said movable wall member and said collet to cause contraction of said collet in accordance with movement of said movable wall member, a base member carrying said head to permit rotation of said head, a pin extending between said head and said base member at the axis of the rotation of said head, said base member carrying a conduit adapted to communicate with a source of fluid under a pressure different than atmospheric pressure, said pin having an opening therein providing communication between said conduit and said open space, and sealing means for providing a seal between said pin and one of said base member and said head.

References Cited in the file of this patent

UNITED STATES PATENTS

| | | |
|---|---|---|
| 926,761 | Oliver | July 6, 1909 |
| 1,260,130 | Bemis | Mar. 19, 1918 |
| 1,421,792 | Linden | July 4, 1922 |
| 1,656,450 | Steuer | Jan. 17, 1928 |
| 2,338,060 | Redmer | Dec. 28, 1943 |
| 2,372,266 | Frank | Mar. 27, 1945 |
| 2,407,696 | Webster | Sept. 17, 1946 |
| 2,418,082 | Marasko | Mar. 25, 1947 |
| 2,454,672 | Rosenthal et al. | Nov. 23, 1948 |
| 2,464,507 | Hahwart et al. | Mar. 15, 1949 |
| 2,476,195 | Horman | July 12, 1949 |
| 2,509,673 | Church | May 30, 1950 |